(12) United States Patent
Lee et al.

(10) Patent No.: US 11,528,081 B2
(45) Date of Patent: Dec. 13, 2022

(54) BASE STATION AND CONTROL METHOD THEREFOR IN WIRELESS COMMUNICATION SYSTEM

(71) Applicant: Samsung Electronics Co., Ltd., Gyeonggi-do (KR)

(72) Inventors: Inkyu Lee, Gyeonggi-do (KR);
Jeongwoo Kim, Gyeonggi-do (KR);
Youngjin Park, Gyeonggi-do (KR);
Sanggeun Lee, Gyeonggi-do (KR);
Jungwon Lee, Gyeonggi-do (KR);
Hyungjoon Cha, Gyeonggi-do (KR);
Junyoung Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 24 days.

(21) Appl. No.: 17/265,733

(22) PCT Filed: Aug. 8, 2019

(86) PCT No.: PCT/KR2019/010022
§ 371 (c)(1),
(2) Date: Feb. 3, 2021

(87) PCT Pub. No.: WO2020/032654
PCT Pub. Date: Feb. 13, 2020

(65) Prior Publication Data
US 2021/0194603 A1 Jun. 24, 2021

(30) Foreign Application Priority Data
Aug. 8, 2018 (KR) .................. 10-2018-0092465

(51) Int. Cl.
*H04B 17/12* (2015.01)
*H04B 17/15* (2015.01)
*H04B 7/06* (2006.01)

(52) U.S. Cl.
CPC ............. *H04B 17/12* (2015.01); *H04B 7/061* (2013.01); *H04B 17/15* (2015.01)

(58) Field of Classification Search
CPC ......... H04B 17/15; H04B 7/061; H04B 17/12
(Continued)

(56) References Cited

U.S. PATENT DOCUMENTS

2013/0301454 A1 11/2013 Seol et al.
2014/0171001 A1 6/2014 Fernando et al.
(Continued)

FOREIGN PATENT DOCUMENTS

KR 0747009 8/2007
KR 1020090054563 6/2009
(Continued)

OTHER PUBLICATIONS

PCT/ISA/210 Search Report issued on PCT/KR2019/010022, dated Nov. 18, 2019, pp. 5.
(Continued)

*Primary Examiner* — Christopher M Crutchfield
*Assistant Examiner* — Jean F Voltaire
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. According to an embodiment of the present invention, a method for controlling a base station supporting a
(Continued)

multi-antenna system may comprise the steps of: generating a plurality of test signals for a plurality of antennas in a modem; controlling the plurality of generated test signals to be fed back to the modem through a plurality of feedback paths which are formed for the plurality of antennas, respectively, and do not affect each other; and identifying the plurality of test signals fed back to the modem, on the basis of the plurality of generated test signals.

14 Claims, 6 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2014/0250971 A1* | 9/2014 | Fang ..................... | G01P 15/125 |
| | | | 73/1.37 |
| 2014/0275732 A1* | 9/2014 | Hillbratt ................ | H04R 25/70 |
| | | | 600/25 |
| 2015/0249965 A1* | 9/2015 | Dussmann ............. | H04B 7/024 |
| | | | 455/501 |
| 2016/0072594 A1* | 3/2016 | Yuan ..................... | H04B 17/21 |
| | | | 455/424 |
| 2016/0191176 A1* | 6/2016 | O'Keeffe ............... | H04B 17/00 |
| | | | 455/63.4 |
| 2017/0302341 A1 | 10/2017 | Yu et al. | |
| 2020/0007244 A1 | 1/2020 | Ban Ghalba | |

FOREIGN PATENT DOCUMENTS

| | | |
|---|---|---|
| KR | 1020130127347 | 11/2013 |
| KR | 1480866 | 1/2015 |
| KR | 1020150095826 | 8/2015 |
| KR | 1020170117859 | 10/2017 |
| WO | WO2017203324 | 11/2017 |

OTHER PUBLICATIONS

PCT/ISA/237 Written Opinion issued on PCT/KR2019/010022, dated Nov. 18, 2019, pp. 5.

* cited by examiner

BASE STATION AND CONTROL METHOD THEREFOR IN WIRELESS COMMUNICATION SYSTEM

PRIORITY

This application is a National Phase Entry of PCT International Application No. PCT/KR2019/010022, which was filed on Aug. 8, 2019, and claims priority to Korean Patent Application No. 10-2018-0092465, which was filed on Aug. 8, 2018, the content of each of which is incorporated herein by reference.

TECHNICAL FIELD

The disclosure relates to a wireless communication system and, more particularly, provides a control method and apparatus for increasing the accuracy of beam forming in a base station supporting multiple antennas.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCAM) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, it has become necessary to improve the accuracy of beam forming in connection with a base station supporting multiple antennas, and to make the base station device compact.

DETAILED DESCRIPTION OF INVENTION

Technical Problem

In line with the above-mentioned necessity, the disclosure provides a method and a base station, wherein beam forming calibration is performed such that the accuracy of beam forming can be improved in connection with a base station supporting multiple antennas, and the base station device can be made compact.

Solution to Problem

A control method of a base station supporting a multi-antenna system according to an embodiment of the disclosure may include the operations of: generating, by a modem, a plurality of test signals for a plurality of antennas; controlling the generated plurality of test signals to be fed back to the modem through a plurality of feedback paths that are formed for each of the plurality of antennas and do not affect each other; and identifying the plurality of test signals fed back to the modem, based on the generated test signals.

Meanwhile, a base station supporting a multi-antenna system according to an embodiment of the disclosure may include: a modem configured to generate a plurality of test signals for a plurality of antennas; and a controller configured to control the generated plurality of test signals to be fed back to the modem through a plurality of feedback paths that are formed for each of the plurality of antennas and do not affect each other, and to control the plurality of test signals fed back to the modem so as to be identified, based on the generated test signals.

Advantageous Effects of Invention

According to an embodiment of the disclosure, a base station device supporting multiple antennas may be made compact. Moreover, by improving the accuracy and efficiency of beamforming calibration, the base station may improve the throughput of beamforming characteristics and coverage characteristics.

MODE FOR THE INVENTION

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

Figure 1:
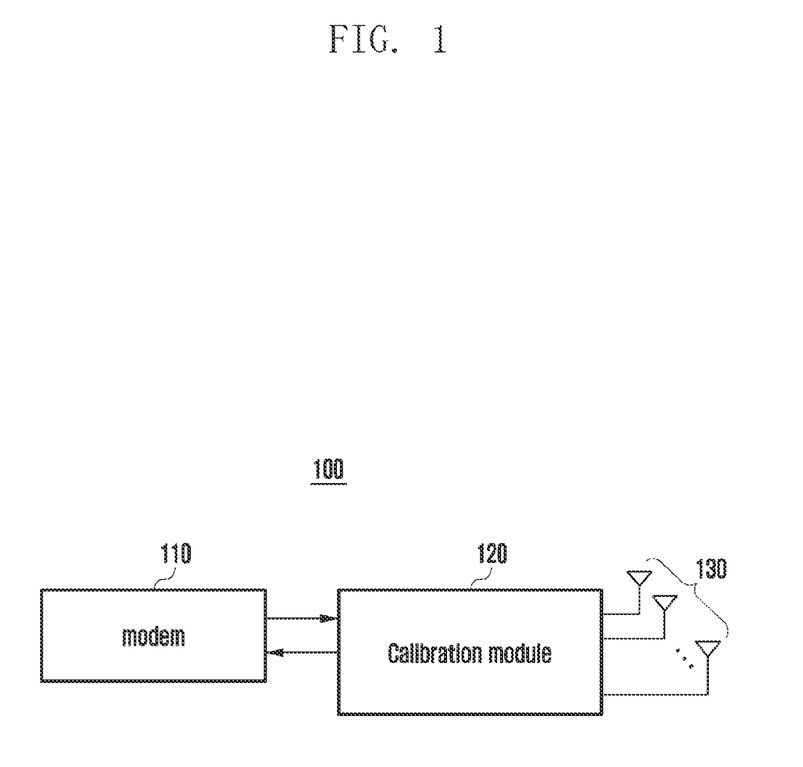
FIG. 1 is a diagram illustrating a structure of a base station supporting multiple antennas according to an embodiment of the disclosure.

FIG. 1 is a diagram illustrating a structure of a base station supporting multiple antennas according to an embodiment of the disclosure. The base station 100 may include a modem 110, a calibration module 120, and antennas 130.

According to an embodiment of the disclosure, the modem 110 may generate a signal. In a 5G wireless communication system, the base station 100 may transmit/receive signals to and from a terminal through beam forming. Accordingly, when the modem 110 generates a signal to be transmitted to the terminal, the generated signal may be formed as a beam and transmitted to the terminal. Further, the received signal may be received by the modem 110 using beamforming from the terminal.

The modem 110 may generate signals (e.g., test signals, calibration signals) for calibrating input/output signals in the base station 100 in order to accurately perform beamforming. For beamforming, the base station 100 needs to generate a beam for the terminal in consideration of the state (e.g., location, coverage, etc.) of the terminal. Accordingly, the base station 100 may find an error that may occur between the signal generated for transmission to the terminal and the signal transmitted through the beam-formed beam, improve errors, generate a beam suitable for the state of the terminal, and transmit the beam to the terminal.

As described above, in order to generate a beam suitable for the state of the terminal, the calibration module 120 may perform a beam forming calibration to find a reference value of a signal generated by the modem 110 and transmitted to the terminal, that is, the final end signal of the base station 100. For example, the calibration module 120 may include a plurality of feedback paths corresponding to the number of antennas. Accordingly, the calibration module 120 may control a signal generated by the modem 110 for each of the plurality of feedback paths to be fed back to the modem 110. Accordingly, the base station 100 can identify an error between the generated signal and an output signal based on the generated signal (e.g., how the output signal is distorted after the signal generated by the modem 110 passes through various signal processing stages in the base station 100).

According to an embodiment, the calibration module 120 may include a coupler for controlling an output of the modem 110 and an arbitrary path among the plurality of feedback paths to be connected such that a signal (hereinafter, a test signal) for calibrating the input/output signal generated by the modem 110 is transmitted through a feedback path. The coupler may connect a filter through which a signal is output from the modem 110 and the arbitrary path. The coupler may be included in each of the plurality of feedback paths.

The downlink test signal may be fed back to the modem 110 through the feedback path. The downlink test signal may be a signal generated to perform calibration, assuming that the base station 100 transmits to the terminal.

The plurality of feedback paths may have different losses. Accordingly, the calibration module 120 may further include an attenuator corresponding to the loss of each of the plurality of feedback paths. For example, when the base station 100 is established the loss of the plurality of feedback paths may be calibrated. In addition, an attenuator corresponding to the loss of each of the plurality of feedback paths may be connected to each of the plurality of feedback paths.

The number of the feedback paths may correspond to the number of the antennas 130. The antennas 130 according to an embodiment of the disclosure may be multiple antennas. For example, the antennas 130 may be multiple antennas such as a massive multi-input multi-output (MIMO). The Massive MIMO may use dozens or more antennas to transmit large amounts of data at high speed. Accordingly, the calibration module 120 may further include switches for connecting at least one feedback path existing as many as the number of antennas 130 to the modem 110. For example, when the downlink test signal starts from the first feedback path and is sequentially transmitted through the $n^{th}$ feedback path, the calibration module 120 may control the switches to feed back the first downlink test signal fed back through the first feedback path to the modem 110, and to sequentially feed back the $n^{th}$ downlink test signal fed back through the $n^{th}$ feedback path to the modem 110. The sequential feedback from the first downlink test signal to the $n^{th}$ downlink test signal is only an example, and the calibration module 120 may control a plurality of downlink test signals to be simultaneously fed back to the modem 110.

Specifically, the calibration module 120 may group a plurality of test paths and exclude switches for each group. For example, when there are 64 antennas and there are 64 test paths to respectively correspond to the antennas, a first ($1^{st}$) test path to an eighth ($8^{th}$) test path may be configured as a first group test path, a ninth ($9^{th}$) test path to a sixteenth ($16^{th}$) test path may be configured as a second group test path, a seventeenth ($17^{th}$) test path to a twenty-fourth ($24^{th}$) test path may be configured as a third group test path, a twenty-fifth ($25^{th}$) to a thirty-second ($32^{nd}$) test path may be configured as a fourth group test path, a thirty-third ($33^{rd}$) test path to a fortieth ($40^{th}$) test path may be configured as a fifth group test path, a forty-first ($41^{st}$) test path to a forty-eighth ($48^{th}$) test path may be configured as a sixth group test path, a forty-ninth ($49^{th}$) test path to a fifty-sixth ($56^{th}$) test path may be configured as a seventh group test path, and a fifty-seventh ($57^{th}$) to a sixty-fourth ($64^{th}$) test path may be configured as a eighth group test path. The calibration module 120 may include a switch for each group test path. Since there are eight group test paths in the above embodiment, the calibration module 120 may include first to eighth switches. Accordingly, the calibration module 120 may control the first switch so that a feedback signal transmitted through an arbitrary path (e.g., a third test path) in the first group test path is fed back to the modem 110, control the second switch so that the feedback signal transmitted through an arbitrary path (e.g., the tenth test path) in the second group test path is fed back to the modem 110, control the third switch so that the feedback signal transmitted through an arbitrary path (e.g., the 17th test path) in the third group test path is fed back to the modem 110, control the fourth switch so that the feedback signal transmitted through an arbitrary path (e.g., the 32nd test path) in the fourth group test path is fed back to the modem 110, control the fifth switch so that the feedback signal transmitted through an arbitrary path (e.g., the 35th test path) in the fifth group test path is fed back to the modem 110, control the sixth switch so that the feedback signal transmitted through an arbitrary path (e.g., the 45th test path) in the sixth group test path is fed back to the modem 110, control the seventh switch so that the feedback signal transmitted through an arbitrary path (e.g., the 50th test path) in the seventh group test path is fed back to the modem 110, and control the eighth switch so that a feedback signal transmitted through an arbitrary path (e.g., the 63rd test path) in the eighth group test path is fed back to the modem 110. The calibration module 120 may simultaneously control the first to eighth switches. Accordingly, since the calibration module 120 has eight test paths for each group, the calibration module 120 may control the switch 1 to the eighth switch eight times so that each of the eight test paths is connected to the modem 110, thereby calibrating signals to be output through 64 antennas through 64 test paths.

In the above embodiment, the modem 110 may generate test signals of different patterns and simultaneously transmit the test signals through each of the eight group test paths so that the signals transmitted through the eight group test paths can be distinguished. Dividing a plurality of test paths into groups is merely an exemplary embodiment, and the modem 110 may simultaneously generate and transmit as many test signals of different patterns as the number of the antennas. For example, when there are 64 antennas and there are 64 test paths corresponding to each of the antennas, the modem 110 may generate 64 test signals to have different patterns. The calibration module 120 may control an output signal to be fed back to the modem 110 through 64 feedback paths to check how the 64 test signals are output. In this case, since the test signals transmitted through the 64 feedback paths have different patterns, the test signals can be distinguished from each other. Accordingly, the calibration module 120 may not include a switch for controlling the test signals to be sequentially fed back to the modem 110. In addition, even when a switch is present, the calibration module 120 may control the switch so that test signals transmitted through the 64 feedback paths are simultaneously fed back to the modem 110.

Meanwhile, an uplink test signal may also be fed back to the modem 110 through the feedback path. The uplink test signal may be a signal generated by the modem 110 to perform calibration on the assumption that it is a signal received from the terminal. For example, the switch of the above-described calibration module 120 may be controlled to sequentially feed back a plurality of uplink test signals generated by the modem 110 through the calibration module 120. The plurality of feedback paths may have different losses. Accordingly, the calibration module 120 may further include an attenuator corresponding to the loss of each of the plurality of feedback paths. For example, when the base station 100 is established the loss of the plurality of feedback paths may be calibrated, in addition, an attenuator corresponding to a loss of each of the plurality of feedback paths may be connected to each of the plurality of feedback paths.

The calibration module 120 may include a coupler that controls the modem 110 and an arbitrary path from among the plurality of feedback paths to be connected. The coupler may connect a filter through which a signal is output from the modem 110 and the arbitrary path. The coupler may be included in each of the plurality of feedback paths. Accordingly, the uplink test signal may be transmitted through the plurality of feedback paths through the coupler and may be fed back to the modem.

The calibration module 120 may further include switches capable of turning on and off the connection between each of the plurality of antennas 130 and the plurality of feedback paths. While the uplink test signal is calibrated through the calibration module 120, the calibration module 120 may control the switches such that the connection between a feedback path through which the uplink test signal is transmitted and an antenna connected to the feedback path is turned off. Specifically, while the first uplink test signal is fed back to the modem 110 through the first feedback path of the calibration module 120, the calibration module 120 may turn off a switch connecting the first feedback path and the first antenna. Accordingly, external interference signals that may be input through the first antenna may be blocked. According to another embodiment, while the first uplink test signal is fed back to the modem 110 through the first feedback path, the calibration module 120 may turn off all switches from a switch connecting the first feedback path and the first antenna to a switch connecting the $n^{th}$ feedback path and the $n^{th}$ antenna. Alternatively, the calibration module 120 might not include a plurality of switches, but may include a switch for simultaneously connecting a plurality of feedback paths and a plurality of antennas. In this case, the calibration module 120 may control the switch so that the connection between the plurality of feedback paths and the plurality of antennas is cut off while the uplink test signal is fed back to the modem 120.

The calibration module 120 may control the plurality of uplink test signals to be fed back to the modem 110 through the plurality of feedback paths.

Hereinafter, the structure of the modem 110 and the calibration module 120 will be described in detail, and a method of calibrating the test signal generated by the modem 110 by the calibration module 120 will be described in detail.

Figure 2:
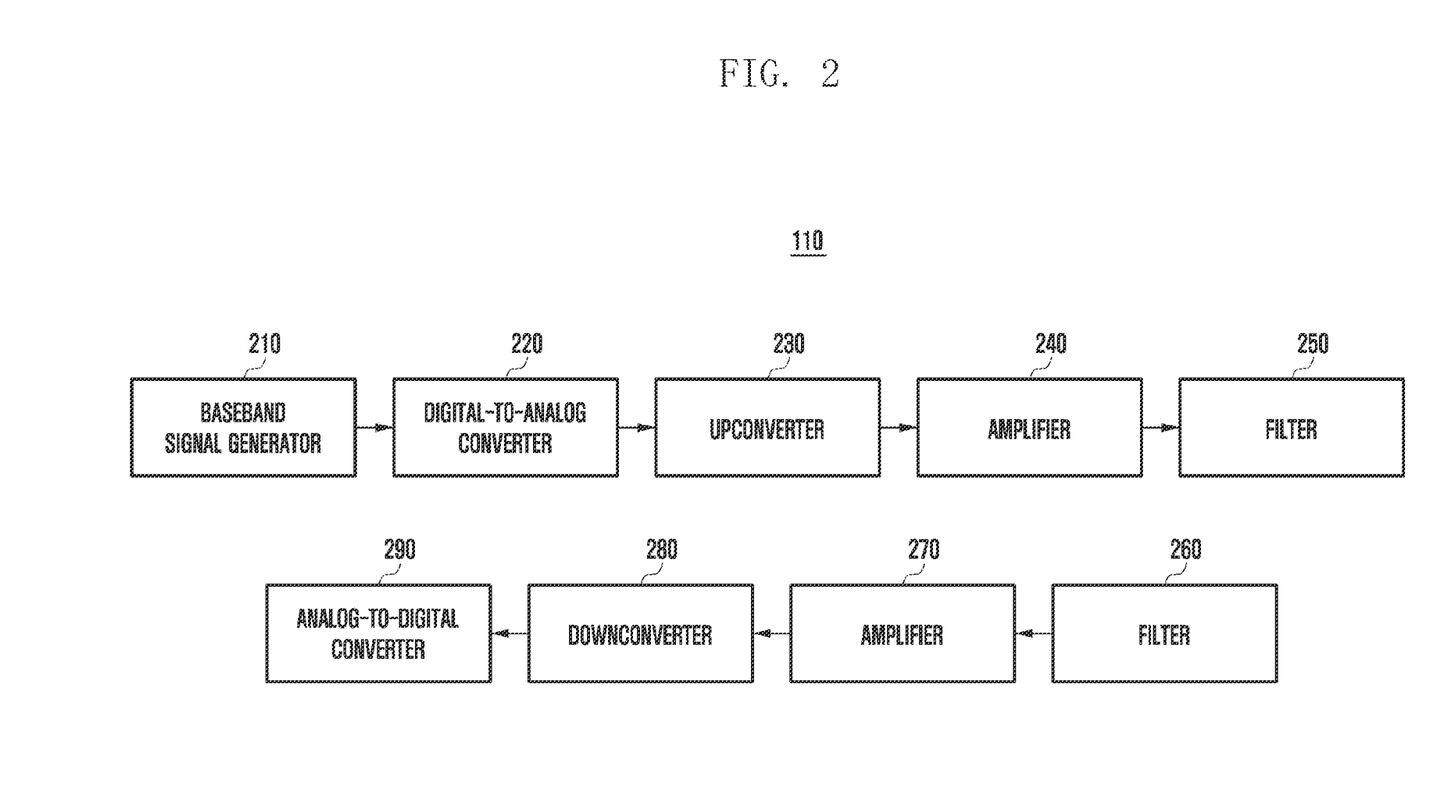
FIG. 2 is a diagram illustrating a structure of a modem of a base station according to an embodiment of the disclosure.

FIG. 2 is a block diagram illustrating a structure of a modem 110 according to an embodiment of the disclosure.

The modem 110 may generate a signal for wireless communication or receive a signal transmitted from another device. In order to generate a signal according to an embodiment, the modem 110 may include a baseband signal generator 210, a digital-to-analog converter (DAC) 220, and an upconverter 230, an amplifier 240, and a filter 250.

The baseband signal generator 210 may generate a baseband signal. The baseband signal may be an unmodulated information signal generated for wireless communication. According to an embodiment of the disclosure, the baseband signal generator 210 may generate a downlink test signal and an uplink test signal.

The digital-to-analog converter (DAC) 220 may convert a digital signal into an analog signal.

The upconverter 230 may upconvert the frequency of the signal. For efficiency of amplification in a base station 100, the generated baseband signal may be converted into a high-frequency signal.

The amplifier 240 may amplify a signal whose frequency is upconverted. For example, the amplifier 240 may be a power amplifier (PA).

The filter 250 may remove and output a frequency component corresponding to an unnecessary component from the amplified signal. For example, the modem 110 may include a band pass filter. The band pass filter can output after removing components below a certain frequency and components above a certain frequency. The filter 250 may be connected to the above-described calibration module 120. Accordingly, the test signal output from the filter 250 may be transmitted to the feedback path of the calibration module 120.

As described above, the signal generated by the baseband signal generator 210 may be distorted compared to the original signal such as a change in size or phase while being output through the DAC 220, the upconverter 230, the amplifier 240, and the filter 250. Accordingly, when the signal generated by the baseband signal generator 210 is output through the filter 250, the base station 100 needs to identify how the signal is output by identifying the difference between the generated signal and the output signal. Accordingly, the modem 110 may generate the test signal, identify how the test signal is output, and detect an error between the generated test signal and the output test signal.

In order to receive a signal according to another embodiment, the modem 110 may include a filter 260, an amplifier 270, a downconverter 280, and an analog-to-digital converter (ADC) 290.

The filter 260 may remove and output a frequency component corresponding to an unnecessary component from the received signal. For example, the modem 110 may include a band pass filter. For example, the test signal output through the feedback path of the calibration module 120 is received again by the filter 260 through the calibration module 120, so that unnecessary frequency components may be removed.

The amplifier 270 may amplify the received signal passing through the filter 260 with low noise. For example, the amplifier 270 may be a low noise amplifier (LNA).

The downconverter 280 may convert the low-noise amplified received signal into a signal having a frequency lower than the input frequency.

The analog-to-digital converter (ADC) 290 may convert an analog signal, which is a continuous signal, into an encoded digital signal. For example, the analog-to-digital converter (ADC) 290 may convert an analog signal converted into a low frequency signal into a digital signal. The modem 110 may check a test signal converted into a digital signal based on the generated test signal.

As described above, the received signal may be distorted compared to the original signal such as a change in size or phase of the signal while being received through the filter 260, the amplifier 270, the down converter 280, and the ADC 290. Accordingly, when the received signal is input through the signal processing stages, the base station 100 needs to identify the difference between the received signal and the input signal to identify how the signal is input. Accordingly, the modem 110 may generate the test signal, identify how the test signal is input, and detect an error between the generated test signal and the input test signal.

Therefore, based on the confirmed test signal, the modem 110 may generate a signal in consideration of an error between the generated signal and the input/output signal. In addition, the base station 100 may transmit the generated signal to the terminal using beamforming. By generating a signal in consideration of errors in the modem, the base station 100 can increase the accuracy of beamforming by more accurately calculating the beamforming value considering the location and phase of the terminal, and beamforming coverage and throughput may be improved.

Figure 3:
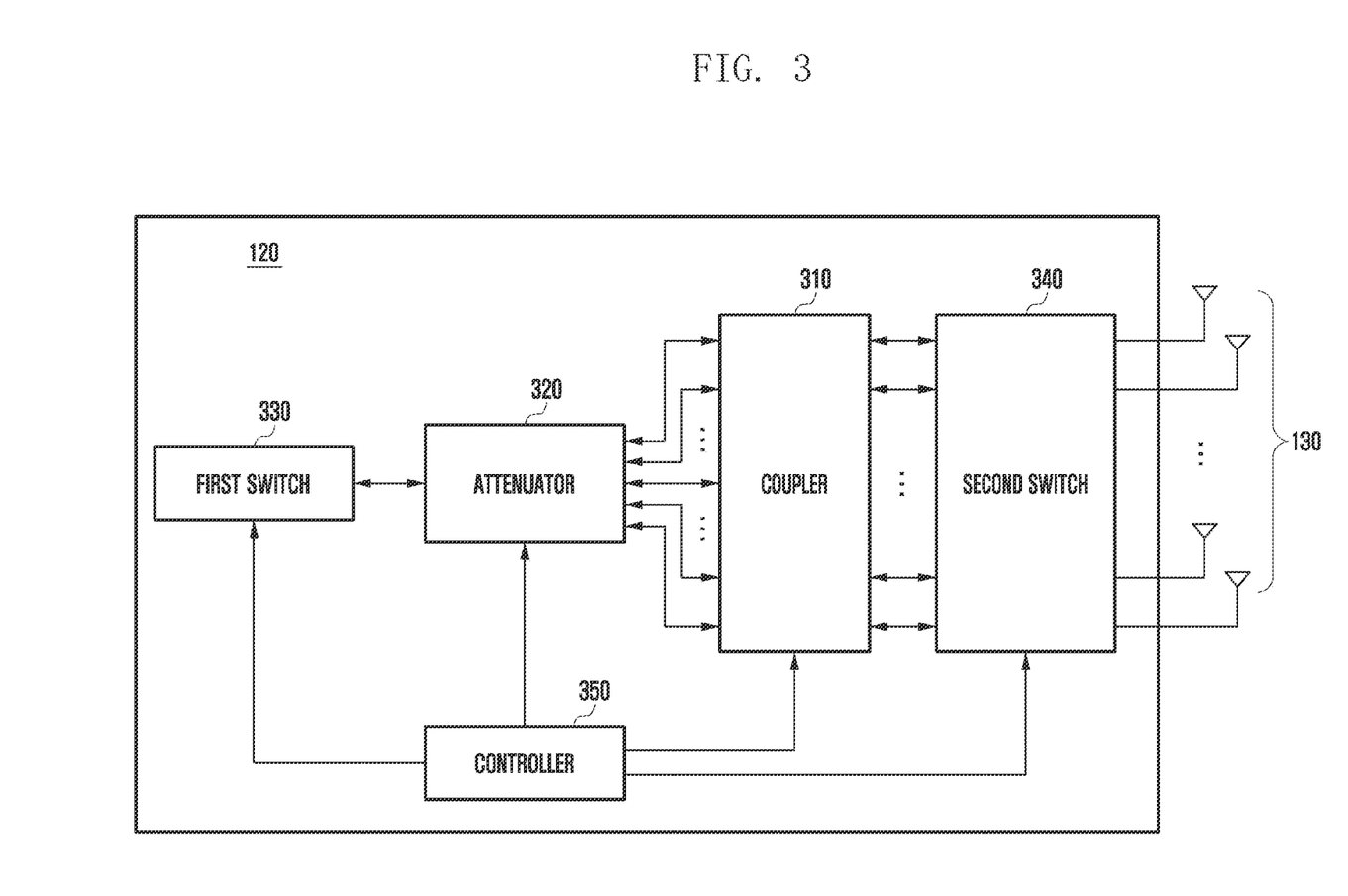
FIG. 3 is a diagram illustrating a structure of a calibration module of a base station according to an embodiment of the disclosure.

Meanwhile, FIG. 3 is a diagram illustrating a structure of a calibration module 120 of a base station according to an embodiment of the disclosure.

According to an embodiment of the disclosure, the calibration module 120 may include a coupler 310, an attenuator 320, a first switch 330, a second switch 340, and a controller 350. The calibration module 120 does not have to include all of the above components, and some components may be omitted according to embodiments. For example, FIG. 3 illustrates an embodiment in which the controller 350 is included in the calibration module 120, but this is only an embodiment, and according to another embodiment, the controller 350 may be located outside the calibration module 120.

The coupler 310 may connect a plurality of feedback paths of the modem 110 and the calibration module 120. For example, the coupler 310 may connect an output unit of the modem 110 and an arbitrary path among the plurality of feedback paths so that a signal (hereinafter, a test signal) for calibrating the input/output signal generated by the modem 110 is transmitted through a feedback path. The coupler 310 may connect a filter through which a signal is output from the modem 110 and the arbitrary path. The coupler 310 may be included in each of the plurality of feedback paths.

The attenuator 320 may compensate for a magnitude error that may occur due to a difference in insertion loss (IL) of the feedback path. For example, the plurality of feedback paths may have different insertion losses. Accordingly, the calibration module 120 may further include an attenuator corresponding to the loss of each of the plurality of feedback paths. For example, when the base station 100 is established, the loss of the plurality of feedback paths may be calibrated. In addition, attenuators corresponding to the loss of each of the plurality of feedback paths may be connected to each of the plurality of feedback paths. Accordingly, the attenuator 320 may include a plurality of attenuators connected to each of the plurality of feedback paths.

For example, the attenuator included in the $i^{th}$ feedback path may perform magnitude correction on a test signal input through the coupler 310 for the $i^{th}$ feedback path.

If the attenuator in the $i^{th}$ feedback path is defined as Ai, the test signal from the connection is Ci, and the average of the ILs of all feedback paths minus the IL of the $i^{th}$ feedback path is defined as X, the magnitude correction in the attenuator of the $i^{th}$ feedback path is given in Equation 1 below.

$$A_i = C_i + X [dB]$$ [Equation 1]

The first switch 330 is a component for switching a plurality of feedback paths of the calibration module 120 to the modem 110.

For example, the calibration module 120 may include a plurality of feedback paths corresponding to the number of antennas of the base station 100. The antenna of the disclosure may be multiple antennas. Therefore, a plurality of feedback paths corresponding to the number of antennas may exist. In order to feed each test signal output through the plurality of feedback paths to the modem 110, the components of the modem 110 as described above need to exist as many as the plurality of feedback paths. Accordingly, the size of the base station 100 may be increased. A method of implementing a single path using a combiner for miniaturization of the base station 100 apparatus may cause an error due to interference between antennas according to antenna isolation characteristics. For example, when the antenna isolation is 20 dB and the 64T64R massive MIMO antenna, interference signals from other antennas may be calculated as in Equation 2.

Interference signal from other antennas=10×Log 64÷18 dB [Equation 2]

In other words, in the case of a 64T64R massive MIMO antenna, when the isolation between antennas is considered, an interference signal may increase by up to 18 dB and may be input as a feedback path.

Therefore, in the embodiment proposed by the disclosure, in order to reduce the size of the base station 100, the first 330 may be included in the calibration module 120 so that at least one test signal output through the plurality of feedback paths is fed back to the modem 110.

When an uplink test signal is generated by the modem 110 and an uplink calibration is performed, the first switch 330 may be controlled so that test signals generated by the number of the plurality of feedback paths are simultaneously output to the plurality of feedback paths.

The second switch 340 may turn on and off a connection between each of the plurality of antennas 130 and the plurality of feedback paths. For example, while the uplink test signal is being calibrated, the second switch 340 may be controlled so that the connection between the feedback path through which the uplink test signal is transmitted and the antenna connected to the feedback path is turned off. Through the calibration of the uplink test signal, the base station 100 may identify the characteristics of the uplink path and calculate a beam forming weight in consideration of the identified characteristics. While the characteristics of the uplink path are checked, an external interference signal may be input through the antenna 130. If the signal-to-noise ratio (SNR) of the uplink test signal decreases due to the interference signal, an error may occur in the calibration. Accordingly, in order to solve a problem in which an error may occur in the calibration, the second switch 340 may block an input of an external interference signal while the uplink test signal is being calibrated. For example, the second switch 340 may be turned off to cut off a connection between a feedback path through which the uplink test signal is transmitted and an antenna connected to the feedback path.

Specifically, while the first uplink test signal is fed back to the modem 110 through the first feedback path of the calibration module 120, the second switch 340 connecting the first feedback path and the first antenna may be turned off. Accordingly, external interference signals that may be input through the first antenna may be blocked. According to another embodiment, while the first uplink test signal is fed back to the modem 110 through the first feedback path, all switches included in the second switch 340 from the switch connecting the first feedback path and the first antenna to the switch connecting the $n^{th}$ feedback path and the $n^{th}$ antenna may be turned off. Alternatively, the second switch 340 may include a plurality of switches, but this is only an example, and may be implemented as a switch for simultaneously connecting a plurality of feedback paths and a plurality of antennas. In this case, while the uplink test signal is fed back to the modem 120, the second switch 340 may be turned off so that the connection between the plurality of feedback paths and the plurality of antennas is cut off.

The controller 350 may control the calibration module 120 overall. For example, the controller 350 may control on/off of at least one switch included in the first switch 330 and the second switch 340. In addition, the controller 350 may control the coupler 310 so that a test signal generated by the modem 110 is input to the calibration module 120. In addition, the controller 250 may control the attenuator 320 to correct an error caused by an IL difference.

According to an embodiment of the disclosure, the controller 350 may control the calibration module 120 to perform calibration on a test signal at predetermined time intervals. For example, when a predetermined time arrives, the controller 350 may request the modem 110 to transmit a test signal for calibration. When the modem 110 transmits a downlink test signal for a plurality of test paths, the controller 350 may control a downlink test signal to be sequentially input to the plurality of test paths and to feed back the downlink test signal to the modem.

In addition, the controller 350 may control the modem 110 to generate a plurality of test signals. In addition, the controller 350 may identify the test signal ted back from the modem 110 and control to detect an error.

Hereinafter, with reference to FIGS. 4A and 4B, an embodiment in which a base station performs calibrations on downlink and uplink signals according to various embodiments of the disclosure will be described in detail.

Figure 4A:
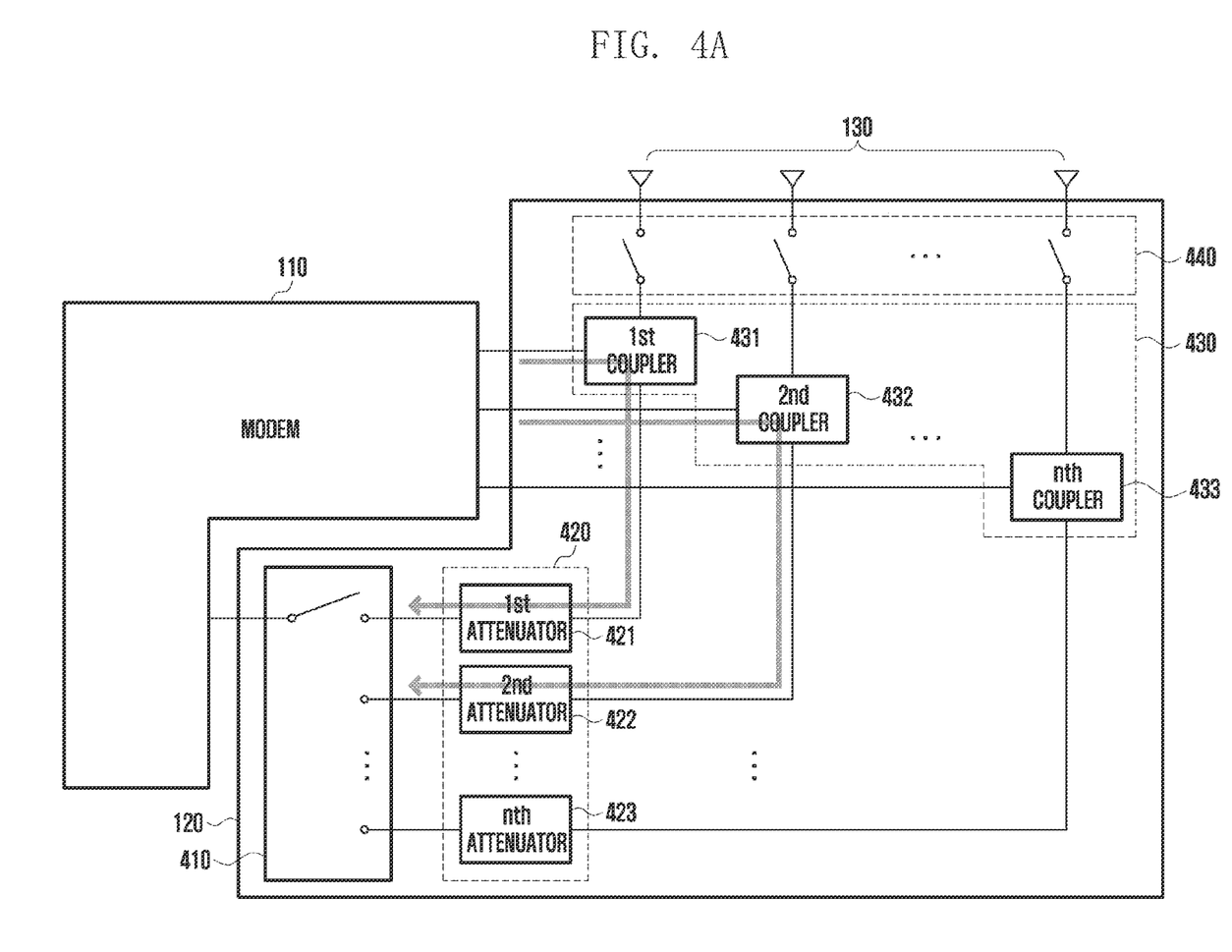
FIGS. 4A and 4B are diagrams illustrating an embodiment in which a base station performs calibrations on downlink and uplink signals according to various embodiments of the disclosure.

According to an embodiment of the disclosure, FIG. 4A illustrates the operation of the calibration module 120 when the base station performs calibration on a downlink test signal. The downlink test signal may be a signal generated to perform calibration, assuming that the base station 100 transmits to the terminal. As described above, the signal generated by the baseband signal generator 210 of the modem 110 may be distorted compared to the original signal while being output through components of the modem 110 such as the DAC 220, the upconverter 230, the amplifier 240, and the filter 250. Accordingly, when the signal generated by the baseband signal generator 210 is output through the filter 250, the base station 100 needs to identify how the signal is output by identifying the difference between the generated signal and the output signal. Accordingly, the modem 110 may generate the test signal, identify how the test signal is output, and detect an error between the generated test signal and the output test signal.

The calibration module 120 may include a plurality of feedback paths corresponding to the number of antennas. When calibrating a downlink test signal, the downlink test signal may be fed back to the modem 110 through the plurality of feedback paths. For example, the downlink test signal may be output from the modem 110, and may be fed back to the modem 110 through each of a plurality of feedback paths including a coupler 430, an attenuator 420, and a first switch 410.

According to an embodiment, the calibration module 120 may include the coupler 430 that controls an output unit of the modem 110 and an arbitrary path among the plurality of feedback paths to be connected such that a signal for calibrating a downlink test signal generated by the modem 110 (hereinafter, a test signal) is transmitted through a feedback path. For example, the coupler 430 may connect a filter through which a signal is output from the modem 110 and the arbitrary path.

The coupler 430 may be included in each of the plurality of feedback paths. For example, the first feedback path may include a first coupler 431 and a downlink test signal output through the first feedback path may be transmitted. The second feedback path may include a second coupler 432 to transmit a downlink test signal output through the second feedback path. In addition, an $n^{th}$ coupler 433 may be included in the $n^{th}$ feedback path, so that a downlink test signal output through the $n^{th}$ feedback path may be transmitted.

The plurality of feedback paths may have different losses. Accordingly, the calibration module 120 may further include an attenuator 420 corresponding to the loss of each of the plurality of feedback paths. For example, when the base station 100 is created, the loss of the plurality of feedback paths may be calibrated. In addition, an attenuator 420 corresponding to a loss of each of the plurality of feedback paths may be connected to each of the plurality of feedback paths. For example, a first attenuator 421 may be included in the first feedback path, so that loss of the first feedback path can be compensated. A second attenuator 422 is included in the second feedback path, so that loss of the second feedback path can be compensated. In addition, the $n^{th}$ attenuator 423 is included in the $n^{th}$ feedback path, so that loss of the $n^{th}$ feedback path can be compensated.

The number of feedback paths may correspond to the number of the antennas 130. The antennas 130 according to an embodiment of the disclosure may be multiple antennas. For example, the antennas 130 may be multiple antennas such as a massive multi input multi output (MIMO). The massive MIMO can use dozens or more antennas to transmit large amounts of data at high speed. Accordingly, the calibration module 120 may further include a first switch 410 for connecting at least one feedback path existing as many as the number of antennas 130 to the modem 110. For example, when the downlink test signal starts from the first feedback path and is sequentially transmitted through the $n^{th}$ feedback path, the calibration module 120 may control the first switch 410 to feed back the first downlink test signal fed back through the first feedback path to the modem 110, and to sequentially feed back the $n^{th}$ downlink test signal fed back through the $n^{th}$ feedback path to the modem 110. It is only one embodiment that at least one test signal is sequentially fed back from the first downlink test signal to the $n^{th}$ downlink test signal. The calibration module 120 may control the first switch 410 so that a plurality of downlink test signals are simultaneously fed back to the modem 110.

The second switch 440 may turn on and off a connection between each of the multiple antennas 130 and the plurality of feedback paths. For example, in order to prevent an interference signal from being input through the antennas 130 while calibration is performed on the downlink test signal, at least one switch included in the second switch 440 may be turned off. FIG. 4A illustrates that the second switch 440 includes a switch in each of a plurality of feedback paths, but this is only an example, and the second switch 440 may be implemented as at least one switch that turns on and off connections between the plurality of antennas 130 and the plurality of feedback paths.

Figure 4B:
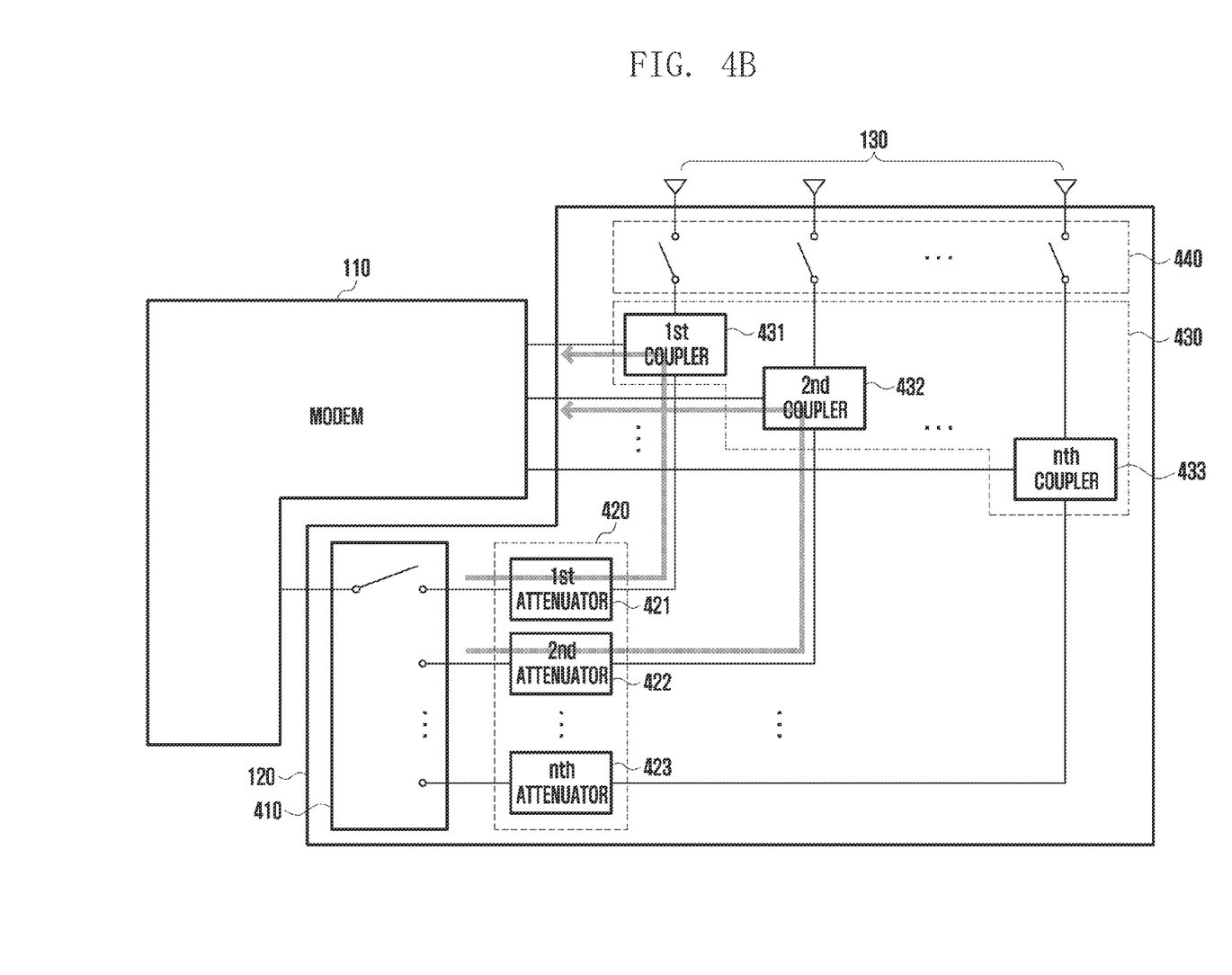

Meanwhile, FIG. 4B illustrates the operation of the calibration module 120 when the base station performs calibration on an uplink test signal. The uplink test signal may also be fed back to the modem 110 through the feedback path. The first switch 410 of the calibration module 120 may sequentially input a plurality of uplink test signals generated by the modem 110 through the calibration module 120.

The plurality of feedback paths may have different losses. Accordingly, the calibration module 120 may further include an attenuator 420 corresponding to the loss of each of the plurality of feedback paths. For example, when the base station 100 is created, the loss of the plurality of feedback paths may be calibrated. In addition, attenuators corresponding to a loss of each of the plurality of feedback paths may be connected to each of the plurality of feedback paths. For example, a first attenuator 421 may be included in the first feedback path, so that loss of the first feedback path can be compensated. A second attenuator 422 may be included in the second feedback path, so that loss of the second feedback path can be compensated. In addition, the $n^{th}$ attenuator 423 may be included in the $n^{th}$ feedback path, so that loss of the $n^{th}$ feedback path can be compensated.

The uplink test signal from which the loss in the feedback path is compensated may be fed back to the modem 110 through the coupler 430. The coupler 430 may connect the filter of the modem 110 and the plurality of feedback paths. The coupler 430 may be included in each of the plurality of feedback paths. For example, the first feedback path may include a first coupler 431 and a downlink test signal output through the first feedback path may be transmitted. The second feedback path may include a second coupler 432 to transmit a downlink test signal output through the second feedback path. In addition, an $n^{th}$ coupler 433 may be included in the $n^{th}$ feedback path, so that a downlink test signal output through the $n^{th}$ feedback path may be transmitted. Accordingly, the uplink test signal transmitted through the plurality of feedback paths may be fed back to the modem through the coupler 430.

The second switch 440 may turn on and off a connection between each of the plurality of antennas 130 and the plurality of feedback paths. While the uplink test signal is calibrated through the calibration module 120, the calibration module 120 may control the second switch 440 to turn off a connection between a feedback path through which the uplink test signal is transmitted and an antenna connected to the feedback path. Specifically, while the first uplink test signal is fed back to the modem 110 through the first feedback path of the calibration module 120, the calibration module 120 may turn off the switch 441 of the second switch 440 connecting the first feedback path and the first antenna. Accordingly, external interference signals that may be input through the first antenna may be blocked. According to another embodiment, while the first uplink test signal is fed back to the modem 110 through the first feedback path, the calibration module 120 may turn off all of the second switches 441, 442, and 443 from a switch connecting the first feedback path and the first antenna to a switch connecting the $n^{th}$ feedback path and the $n^{th}$ antenna. Alternatively, the second switch 440 may not include a plurality of switches 441, 442, and 443, and may be implemented as at least one switch for simultaneously connecting a plurality of feedback paths and a plurality of antennas. In this case, the calibration module 120 may control the second switch 440 so that the connection between the plurality of feedback paths and the plurality of antennas 130 is blocked while the uplink test signal is fed back to the modem 120.

The calibration module 120 may control the plurality of uplink test signals to be fed back to the modem 110 through the plurality of feedback paths.

Figure 5:
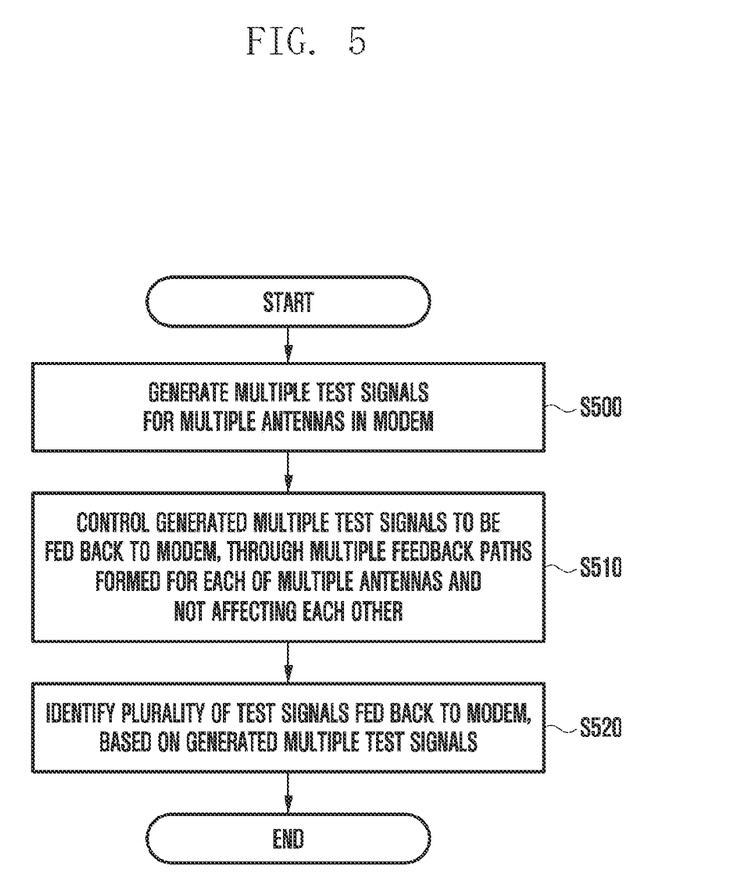
FIG. 5 is a flowchart illustrating a method of controlling a base station according to an embodiment of the disclosure.

Meanwhile, FIG. 5 is a flowchart illustrating a method of controlling a base station according to an embodiment of the disclosure. First, in step S500, the base station may generate a plurality of test signals for a plurality of antennas in the modem. For example, the modem may generate a downlink test signal and an uplink test signal. The downlink test signal may be a signal generated by a modem to perform calibration, assuming that the base station 100 transmits to the terminal. The uplink test signal may be a signal generated by the modem to perform calibration assuming that it is a signal received from the terminal.

In step S510, the base station may control the generated test signals to be fed back to the modem through a plurality of feedback paths that are formed for each of the plurality of antennas and do not affect each other. The base station of the disclosure may support multiple antennas (e.g., massive MIMO) according to an embodiment. Accordingly, the modem may generate signals transmitted through a large number (e.g., dozens) of antennas. In order to perform calibration on each of the signals transmitted through a large number of antennas as described above, the calibration module of the base station may include a feedback path corresponding to the number of the antennas. In order to increase the accuracy of calibration for each signal transmitted through a plurality of antennas, the plurality of feedback paths should not affect each other. To this end, the calibration module may include a coupler for connecting each of the modem and the plurality of feedback paths, include an attenuator for compensating for the loss of each of the plurality of feedback paths, and include a switch for controlling the test signals transmitted through a plurality of feedback paths to be sequentially fed back to the modem at least one by one. In addition, while the test signal is calibrated through the plurality of feedback paths, the calibration module may further include a switch for turning off the connection between the plurality of feedback paths and the plurality of antennas so that interference signals are not input through the plurality of antennas.

In step S520, the base station may identify a plurality of test signals fed back to the modem based on the generated test signals. For example, the modem may identify an error between a signal generated by the baseband signal generator and a signal output from a filter by identifying a signal generated by the baseband signal generator and a test signal fed back.

Therefore, the modem 110 may generate a signal in consideration of an error between the generated signal and the input/output signal, based on the confirmed test signal. In addition, the base station 100 may transmit the generated signal to the terminal using beamforming. The base station 100 can increase the accuracy of beamforming by more accurately calculating the beamforming value considering the location and phase of the terminal by generating a signal in consideration of an error in the modem, thereby improving beamforming coverage and throughput.

Meanwhile, the components of the base station described above may be implemented in software. For example, the controller of the base station may further include a flash memory or other nonvolatile memory. Programs for performing respective roles of the controller may be stored in the nonvolatile memory.

In addition, the controller of the base station may be implemented in a form including a CPU and a random access memory (RAM). The CPU of the controller may perform the functions of the base station as described above by copying the above-described programs stored in the nonvolatile memory to RAM and then executing the copied programs.

The controller is a component responsible for controlling the base station. The controller may be used interchangeably with the same meaning as a central processor, a microprocessor, a processor, and an operating system. In addition, the controller of the base station may be implemented as a single-chip system (system-on-a-chip or system on chip, SOC, SoC) together with other functional units such as a modem included in the base station.

Meanwhile, the control method of the base station according to the various embodiments described above may be coded with software and stored in a non-transitory readable medium. Such a non-transitory readable medium may be mounted and used in various devices.

The non-transitory readable medium refers to a medium that stores data semi-permanently and can be read by a device, not a medium that stores data for a short moment, such as a register, cache, or memory. Specifically, it may be a CD, DVD, hard disk, Blu-ray disk, USB, memory card, ROM or the like.

In addition, although the preferred embodiments of the disclosure have been illustrated and described above, the disclosure is not limited to the specific embodiments described above. It goes without saying that the disclosure can be implemented in various modifications by those of ordinary skill in the art to which the disclosure belongs without departing from the gist of the disclosure claimed in the claims. These modified implementations should not be individually understood from the technical idea or perspective of the disclosure.

The invention claimed is:

1. A base station supporting a multi-antenna system, the base station comprising:
a modem configured to generate a plurality of test signals for a plurality of antennas;
a plurality of first switches;
a plurality of second switches connecting respective feedback paths of a plurality of feedback paths and antennas of the plurality of antennas; and
a controller configured to:
control the generated plurality of test signals to be fed back to the modem through a plurality of feedback paths that are formed for each of the plurality of antennas and do not affect each other,
control a second switch connecting a first feedback path and a first antenna, wherein the second switch is turned off while a first test signal transmitted through a first feedback path is fed back, such that an interference signal for the first antenna is blocked, and
control the plurality of test signals fed back to the modem so as to be identified, based on the generated test signals.

2. The base station of claim 1, wherein the controller is further configured to control a first switch to connect the modem to the first feedback path transmitting a first downlink test signal among the plurality of feedback paths in order for the first downlink test signal to be fed back to the modem.

3. The base station of claim 1, further comprising:
a plurality of couplers,
wherein the controller is further configured to control a first coupler such that the modem and the first feedback path of a calibration module including the plurality of feedback paths are connected in order to transmit a first downlink test signal to the first feedback path among the plurality of feedback paths.

4. The base station of claim 1, further comprising:
a plurality of couplers,
wherein the controller is further configured to sequentially connect the plurality of couplers in order to sequentially transmit a plurality of downlink test signals for each of the plurality of feedback paths, and control a first switch so that the plurality of first switches are sequentially turned on so that the plurality of downlink test signals are sequentially fed back to the modem.

5. The base station of claim 1, wherein each of the plurality of feedback paths includes an attenuator for compensating for a loss for the plurality of feedback paths.

6. The base station of claim 1, wherein the controller is further configured to control a first switch to connect the modem to the first feedback path for transmitting the first uplink test signal among the plurality of feedback paths in order to feed back the first uplink test signal to the modem.

7. The base station of claim 6, wherein the controller is further configured to control the first switch to connect the modem with the first and second feedback paths each transmitting the first uplink test signal and the second uplink test signal in order to simultaneously transmit a plurality of uplink test signals through the plurality of feedback paths.

8. The base station of claim 1, wherein the controller is further configured to control the plurality of second switches to turn off respective connections between the plurality of feedback paths and the plurality of antennas.

9. The base station of claim 1, wherein each of the plurality of feedback paths is connected to each of the plurality of antennas, and a test signal generated corresponding to each of the plurality of antennas is calibrated through each of the plurality of feedback paths.

10. A control method of a base station supporting a multi-antenna system, the method comprising:
generating, by a modem, a plurality of test signals for a plurality of antennas; and
controlling the generated plurality of test signals to be fed back to the modem through a plurality of feedback paths that are formed for each of the plurality of antennas and do not affect each other;
controlling a second switch connecting a first feedback path and a first antenna, wherein the second switch is turned off while a first test signal transmitted through a first feedback path is fed back, such that an interference signal for the first antenna is blocked; and
identifying the plurality of test signals fed back to the modem, based on the generated test signals.

11. The method of claim 10, wherein the controlling the generated plurality of test signals further comprises controlling a first switch to connect the modem to the first feedback path transmitting the first downlink test signal among the plurality of feedback paths in order for a first downlink test signal to be fed back to the modem.

12. The method of claim 10, further comprising controlling a first coupler such that the modem and the first feedback path of a calibration module including the plurality of feedback paths are connected in order to transmit a first downlink test signal to a first feedback path among the plurality of feedback paths,
wherein the controlling the generated plurality of test signals comprises:
sequentially connecting a plurality of couplers in order to sequentially transmit a plurality of downlink test signals for each of the plurality of feedback paths, and
controlling a first switch so that the plurality of first switches are sequentially turned on so that the plurality of downlink test signals are sequentially fed back to the modem.

13. The method of claim 10, wherein the controlling the generated plurality of test signals further comprises controlling a first switch to connect the modem to the first feedback path for transmitting the first uplink test signal among the plurality of feedback paths in order to feed back the first uplink test signal to the modem, wherein the controlling the generated plurality of test signals comprises controlling the first switch to connect the modem with the first and second feedback paths each transmitting the first uplink test signal and the second uplink test signal in order to simultaneously transmit a plurality of uplink test signals through the plurality of feedback paths, wherein each of the plurality of feedback paths includes an attenuator for compensating for a loss for the plurality of feedback paths, and wherein each of the plurality of feedback paths is connected to each of the plurality of antennas, and a test signal generated corresponding to each of the plurality of antennas is calibrated through each of the plurality of feedback paths.

14. The method of claim 10, wherein controlling the second switch comprises controlling the plurality of second switches to turn off connecting respectively between the plurality of feedback paths and the plurality of antennas.

* * * * *